(12) United States Patent
Hastie et al.

(10) Patent No.: US 7,673,123 B2
(45) Date of Patent: Mar. 2, 2010

(54) SYSTEM AND METHOD FOR CLASSIFYING BRANCH INSTRUCTIONS INTO MULTIPLE CLASSES FOR BRANCH PREDICTION

(75) Inventors: Neil Hastie, Gloucestershire (GB); Graham Donohoe, Hamburg (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 11/330,404

(22) Filed: Jan. 12, 2006

(65) Prior Publication Data
US 2006/0179292 A1 Aug. 10, 2006

(30) Foreign Application Priority Data
Jan. 13, 2005 (DE) .................. 10 2005 001 679

(51) Int. Cl.
*G06F 9/00* (2006.01)
(52) U.S. Cl. ...................... 712/239; 712/240
(58) Field of Classification Search .................. 712/239, 712/240, 234
See application file for complete search history.

(56) References Cited

U.S. PATENT DOCUMENTS

| | | | |
|---|---|---|---|
| 5,812,839 A | | 9/1998 | Hoyt |
| 6,085,315 A | | 7/2000 | Fleck et al. |
| 6,108,773 A | * | 8/2000 | Col et al. .................... 712/237 |
| 6,247,122 B1 | * | 6/2001 | Henry et al. ................ 712/239 |
| 6,269,438 B1 | * | 7/2001 | Chang ........................ 712/233 |
| 6,553,488 B2 | * | 4/2003 | Yeh et al. .................... 712/239 |
| 7,120,784 B2 | * | 10/2006 | Alexander et al. .......... 712/240 |
| 7,404,070 B1 | * | 7/2008 | Patil et al. ................... 712/239 |

OTHER PUBLICATIONS

Shen, John Paul, Lipasti, Mikko H. "Modern Processor Design: Fundamentals of Superscalar Processors" McGraw-Hill, 1$^{st}$ edition. pp. 456-457.*
Ball, Thomas, Larus, James R. "Branch prediction for free" Jun. 1993.*
P. Chang, E. Hao, T. Yeh, and Y. Patt. Branch classification: a new mechanism for improving branch predictor performance. In MICRO-27, Nov. 1994.*
M. Haungs, P. Sallee, and M. Farrens. Branch transition rate: A new metric for improved branch classification analysis. In Proc. HPCA, pp. 241-250, 2000.*
C. Young and M. D. Smith. Static correlated branch prediction. ACM Trans. On Programming Languages and Systems, May 1999.*
Chang, P. et al. (1994). "Branch Classification: A New Mechanism for Improving Branch Predictor Performance," In Proceedings of the 27th Annual International Symposium on Microarchitecture, pp. 22-31.
Driesen, K. et al. (Jun. 1997). "Limits of Indirect Branch Prediction," Technical Report TRCS97-10, University of California, Santa Barbara, pp. 1-20.

* cited by examiner

*Primary Examiner*—David J Huisman
*Assistant Examiner*—Jacob Petranek
(74) *Attorney, Agent, or Firm*—Slater & Matsil, L.L.P.

(57) ABSTRACT

The invention relates to a microprocessor device and to a branch prediction method that determines which of a plurality of predetermined branch classes a respective branch instruction to be executed is assigned to, and determines whether the branch is likely to be taken or not, depending on the branch class determined. Advantageously, a respective adaptive branch prediction device assigned to the determined branch class is used for determining whether the branch is likely to be taken or not.

19 Claims, 4 Drawing Sheets

SYSTEM AND METHOD FOR CLASSIFYING BRANCH INSTRUCTIONS INTO MULTIPLE CLASSES FOR BRANCH PREDICTION

CLAIM FOR PRIORITY

This application claims the benefit of priority to German Application No. 10 2005 001 679.0, filed in the German language on Jan. 13, 2005, the contents of which are hereby incorporated by reference.

TECHNICAL FIELD OF THE INVENTION

The invention relates to a microprocessor device, and to a branch prediction method, in particular for use in a microprocessor device.

BACKGROUND OF THE INVENTION

In the case of conventional microprocessor devices, appropriate machine instructions are read out from a central memory and are then processed by an interpreter, are in particular interpreted into a sequence of executable micro operations.

To increase the performance of microprocessor devices, they may have a so-called "pipeline" structure: Here, one or a plurality of operations, e.g. the operation "interpret machine instruction", may be subdivided into a plurality of partial steps (e.g. into the partial steps "Instruction Fetch", and/or "Instruction Decoding", and/or "Address Generation", and/or "Operand Fetch", and/or "Execute", and/or "Store Result", and/or "Update Program Counter", etc., etc.), wherein each partial step is processed by a separate processing unit ("step").

The individual processing units or steps may be connected with each other via appropriate latches, data and control paths such that a parallel, sequential processing of a plurality of different machine instructions is possible (wherein, at a particular time, each step in parallel processes respectively different instructions).

An "Instruction Fetch" step may, for instance, continually sequentially load machine instructions from the central memory which are stored in succession. In an "Instruction Decoding" step, a corresponding instruction taken from the "Instruction Fetch" step is decoded while the "Instruction Fetch" step already transfers the next instruction from the memory to the processor. An "Address Generation" step receives the instruction part and appropriate control information required for addressing (e.g. the type of addressing) from the "Instruction Decoding" step and calculates the operand addresses that are transmitted to an "Operand Fetch" step (while—in parallel—the "Instruction Fetch" step already loads a further machine instruction from the central memory, and, in the "Instruction Decoding" step, the instruction that has last been loaded by the "Instruction Fetch" step is decoded, etc., etc.)

The pipelining concept requires a special architecture that has to be designed such that the individual steps are adapted to actually process different instructions in parallel and, in so doing, influence each other as little as possible.

Since the "Instruction Fetch" step fetches—as explained above—the instructions as a rule sequentially from the central memory, irrelevant instructions that are not to be executed at the moment may be loaded into the pipeline in the case of (conditional or unconditional) jump instructions or branches and/or subroutine calls, which results in substantial performance loss.

Unconditional jumps (and subroutine calls) may be detected early by means of specific control mechanisms, whereupon there may be induced that the "Instruction Fetch" step continues at the new position in the program even before the PC (Program Counter) has been modified correspondingly by the "Update Program Counter" step.

Contrary to that, the target of conditional jumps can be detected only on evaluation of the respective condition, e.g. only by the "Execute" step. Possibly, the entire content of the pipeline may have to be rejected then—in correspondence with the respective condition.

This may, for instance, be prevented in that the pipeline mechanism is stopped as soon as the "Instruction Decoding" step recognizes a conditional jump instruction. The pipeline is released only if the target address of the jump has been determined, or if the PC has been updated, respectively. This procedure that results in a "gap" in the pipeline and thus in a performance loss is referred to as "Interlocking".

In order to avoid or minimize the performance loss occurring with an "Interlocking", so-called—static or dynamic—branch prediction methods may be used.

In so doing, one tries to predict whether a conditional jump is likely to be taken (prediction: "taken"), or not prediction: "not taken").

A simple example are jump operation instructions whose target is indicated relative to the PC (i.e. in which an addressing related to the program counter is used): If the displacement is negative in the case of such jump instructions ("backward" jump), it may be assumed that it is the matter of a loop end. Since a loop is more likely run through than left, it may thus be assumed as a prediction for such a jump instruction that the jump will be taken (prediction: "taken").

If it is predicted that a jump will be taken, it can be induced that the "Instruction Fetch" step breaks through the sequential order during the loading of the machine instructions from the central memory.

To increase the probability of hitting of the predictions, a table may be used in which the target addresses that have been calculated last are entered for as many jumps as possible which have already been taken in a program (so-called jump target cache). The table is managed by the processor and comprises the "history" of the instructions ("Branch History").

Different static and dynamic branch prediction methods are, for instance, described in the book "Computer Architecture: A Quantitative Approach" by Hennessy and Patterson.

SUMMARY OF THE INVENTION

The invention provides a microprocessor device and a novel branch prediction method, in particular a branch prediction method in which a relatively good probability of hitting of the predictions can be achieved with relatively little effort, in particular relatively little hardware effort.

In accordance with an embodiment of the invention there is provided a branch prediction, comprising:

determining which of a plurality of predetermined branch classes a respective branch instruction to be executed is assigned to; and determining whether the branch is likely to be taken or not, depending on the branch class determined.

Advantageously, a branch prediction device assigned to the respective branch class determined is used for determining whether the branch is likely to be taken or not.

In a preferred embodiment of the invention, the respective branch prediction device assigned to the branch class determined is an adaptive branch prediction device.

Preferably, the instruction length of the respective branch instruction to be executed is examined during the determination of the branch class assigned to the respective branch instruction to be executed.

Advantageously—alternatively or additionally—the jump direction of the respective branch instruction to be executed is examined during the determination of the branch class assigned to the respective branch instruction to be executed.

In a preferred embodiment of the invention—alternatively or additionally—the instruction type of the respective branch instruction to be executed is examined during the determination of the branch class assigned to the respective branch instruction to be executed.

In accordance with a further embodiment of the invention, there is a microprocessor device comprising a plurality of branch prediction devices that are assigned to a respective one of a plurality of predetermined branch classes.

Advantageously, the branch prediction devices are adaptive branch prediction devices.

BRIEF DESCRIPTION OF THE DRAWINGS

In the following, the invention will be explained in more detail with reference to exemplary embodiments and the enclosed drawings. In the drawings.

DETAILED DESCRIPTION OF THE INVENTION

Figure 1:
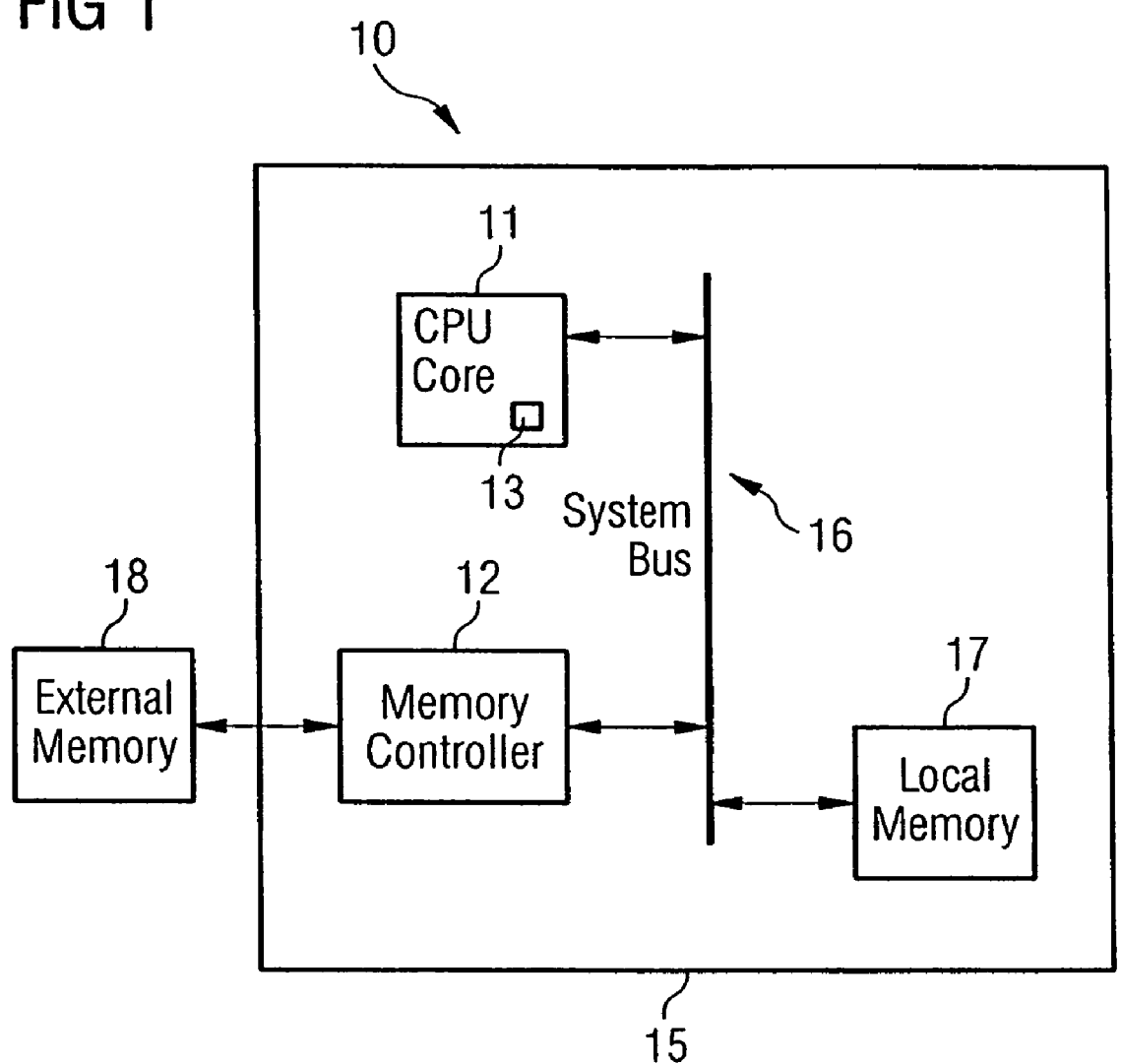
FIG. 1 shows a microcontroller or microprocessor system according to an embodiment of the present invention.

FIG. 1 shows a schematic representation of a microcontroller or microprocessor system 10 according to an embodiment of the invention.

The microcontroller or microprocessor system 10 may, for instance, be an 8 bit microcontroller or microprocessor system 10, or any other microcontroller or microprocessor system, e.g. a corresponding 16 bit, 32 bit, or 64 bit microcontroller or microprocessor system, etc., in particular a multithreaded (MT) microcontroller or microcontroller system, e.g. a TriCore processor system of the company Infineon.

The microcontroller or microprocessor system 10 comprises one or a plurality of (central) control or processing units 11 (Central Processing Units (CPUs) or CPU "Cores") disposed on an appropriate microchip 15.

The CPU 11 or the CPUs are—via a system bus 16 (and possibly one or a plurality of further bus systems)—connected with one or a plurality of internal memories 17 (provided on the same microchip 15 as the CPU 11), and—e.g. via the system bus 16 and one or a plurality of appropriate memory controllers 12—with one or a plurality of external memories 18 (provided on a different microchip than the CPU 11).

The memories 17, 18 may e.g. act as "program memory" and/or "data memory".

The "program memory" comprises in particular the sequence of the instructions to be executed by the CPU(s) 11, i.e. the program (and possibly additionally corresponding data constants to be used by the CPU(s) 11).

The program memory—that is e.g. formed by the memory 17—may, for instance, be formed by an EPROM (Erasable PROM) or an EEPROM (Electrically Erasable PROM), in particular a flash EEPROM device.

Thus, it can be achieved that the program remains stored on the corresponding memory even if the current supply is interrupted.

For programs that have to be changed frequently, there may—alternatively—also be used e.g. RAMs (RAM=Random Access Memory), in particular DRAMs, as program memories that are adapted to be loaded from an external mass storage.

In the above-mentioned "data memory"—that is e.g. formed by the memory 18—the variables—that possibly are to be modified in particular by the CPU(s) 11 during the execution of the program—may be stored.

The data memory may, for instance, be formed by one or a plurality of RAM devices, in particular e.g. by an appropriate DRAM device (DRAM=Dynamic Random Access Memory), or SRAM device (SRAM=Static Random Access Memory).

A software program (or a plurality of such programs, respectively) to be executed by the CPU or the CPU core 11 may be subdivided into a plurality of corresponding software tasks (threads).

This, for instance, has the advantage that—in particular with the multithreaded (MT) microcontroller or microprocessor system 10 illustrated here—a plurality of different tasks can be loaded simultaneously into the CPU core 11 in parallel and can be executed there.

In the CPU core 11—corresponding to conventional CPUs—instructions, in particular machine instructions, that are read out from an appropriate memory, e.g. the memory 17 acting as central memory, are processed by an interpreter, and in particular interpreted into a sequence of executable micro operations.

Figure 2:
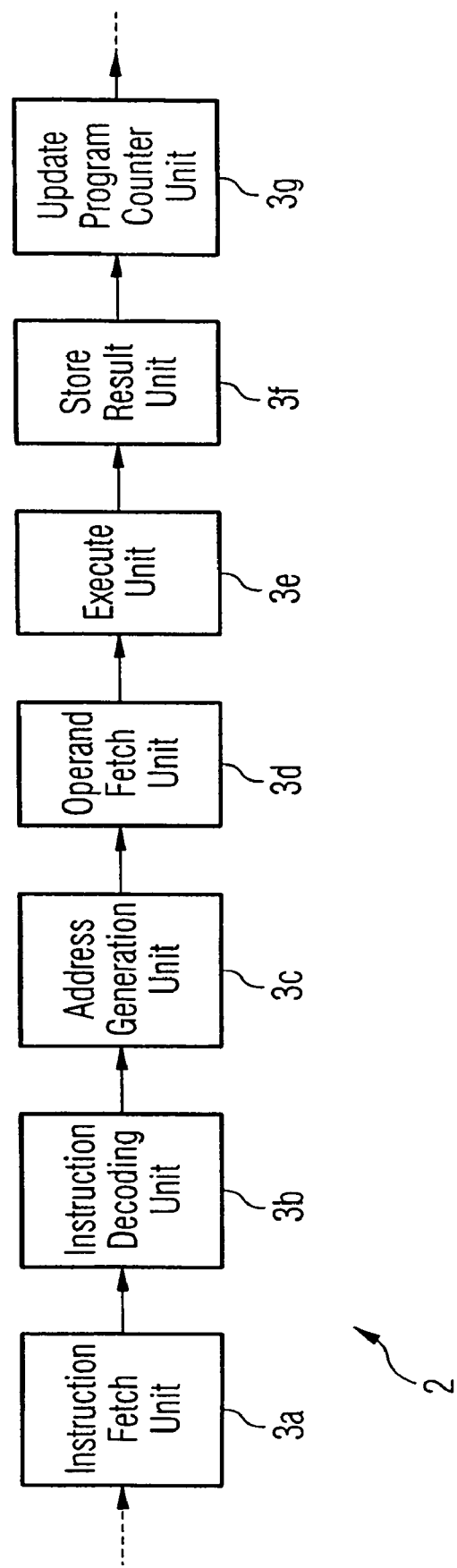
FIG. 2 shows a section of the CPU illustrated in FIG. 1, for illustrating the pipeline structure thereof.

As is illustrated schematically in FIG. 2, the CPU or the CPU core 11 comprises a pipeline structure: Here, one or a plurality of operations, e.g. the operation "interpret machine instruction", may be subdivided into a plurality of partial steps (e.g. into the partial steps "Instruction Fetch", and/or "Instruction Decoding", and/or "Address Generation", and/or "Operand Fetch", and/or "Execute", and/or "Store Result", and/or "Update Program Counter", etc., etc.), wherein each partial step is processed by a separate processing unit ("step") 3a, 3b, 3c, 3d, 3e, 3f, 3g arranged in a corresponding pipeline 2.

The individual processing units or steps 3a, 3b, 3c, 3d, 3e, 3f, 3g of the pipeline 2 may be connected with each other via appropriate latches, data and control paths such that a parallel, sequential processing of a plurality of different machine instructions is possible (wherein, at a particular time, each step 3a, 3b, 3c, 3d, 3e, 3f, 3g in parallel processes respectively different instructions).

An "Instruction Fetch" step 3a may, for instance—in a normal operation of the CPU core 11 (cf. below)—continually sequentially load machine instructions from the central memory which are stored in succession. In an "Instruction Decoding" step 3b, a corresponding instruction taken from the "Instruction Fetch" step 3c is decoded while the "Instruction Fetch" step 3a already loads the next instruction from the central memory. An "Address Generation" step 3c receives the instruction part and appropriate control information required for addressing (e.g. the type of addressing) from the "Instruction Decoding" step 3b and calculates the operand addresses that are transmitted to an "Operand Fetch" step 3*d* (while—in parallel—the "Instruction Fetch" step 3*a* possibly already loads a further machine instruction from the central memory, and, in the "Instruction Decoding" step 3*b*, the instruction that has last been loaded by the "Instruction Fetch" step 3*a* is decoded, etc., etc.).

In order to prevent that the "Instruction Fetch" step 3*a* loads—in particular in the case of (conditional) jump instructions or branches—irrelevant instructions that are not to be executed (at the moment) into the pipeline 2, or—more generally speaking—in order to minimize performance loss caused by (conditional) jump instructions or (conditional) branches, the present embodiment uses a specific mixed static-dynamic (or "adaptively static") branch prediction method that will be explained in detail in the following.

In so doing, it is tried to predict whether a conditional jump is likely to be taken (prediction: "taken") or not (prediction: "not taken").

In the mixed static-dynamic (or adaptively static) branch prediction method according to the embodiment of the invention illustrated here, the jump instructions or branches (in particular the conditional jump instructions (conditional branches)) are classified pursuant to their respective static attributes/characteristics (or combinations thereof).

Conceivable for this is—in particular e.g. with TriCore processors of the company Infineon—i.a. the use of the following characteristics/attributes:

jump direction (forward or backward);
instruction length (e.g. long or short (e.g. 32 bit (long), or 16 bit (short)));
instruction type (e.g. "integer", or "load/store");
instruction function (e.g. JEQ, JNE, JGT, JLE);
task or thread identifier, etc., etc.

In the instant embodiment, the respective conditional jumps (conditional branches) are assigned to one of the following five classes:

Class 1:
Long forward integer branches

Class 2:
Short forward integer branches

Class 3:
Long forward load/store branches

Class 4:
Short forward load/store branches

Class 5:
Backward branches

Figure 3:
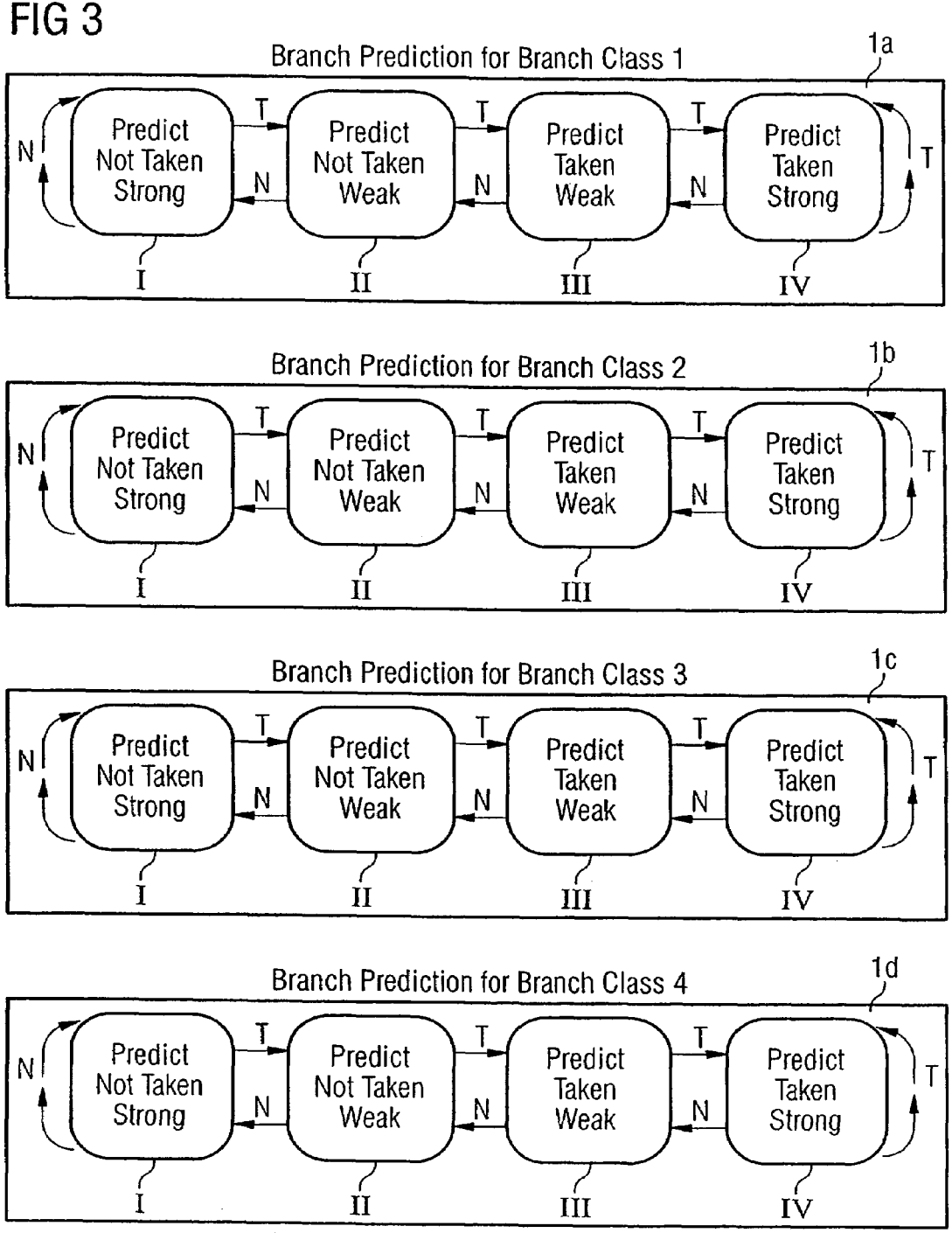
FIG. 3 shows a plurality of branch prediction devices—each used separately for different branch classes—for illustrating the branch prediction method used with the microcontroller or microprocessor system according to the embodiment of the present invention.

For each class—as is illustrated in FIG. 3 for classes 1 to 4—a separate, adaptive branch prediction device 1*a*, 1*b*, 1*c*, 1*d*, etc.—realized, for instance, in the form of an appropriate state machine—is used.

Figure 4:
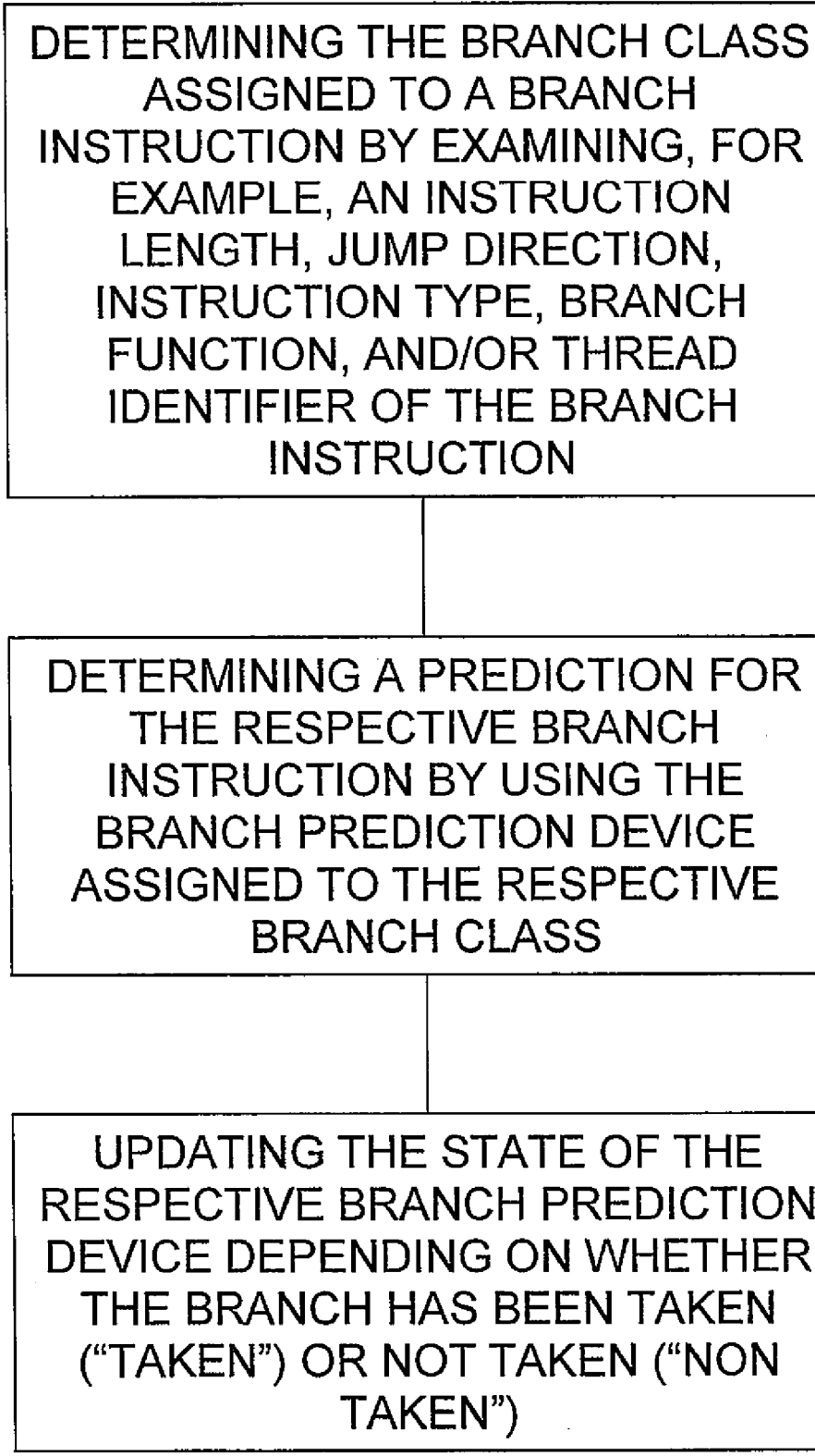
FIG. 4 shows a plurality of process steps performed with the branch prediction method according to the embodiment of the present invention.

As results from FIG. 1, the CPU core 11 comprises a controller 13 by means of which it is determined—in a first step—which of the above-mentioned classes 1, 2, 3, 4, or 5 the next (conditional) jump or branch instruction to be executed belongs to (cf. also process step A illustrated in FIG. 4).

Depending on the result of this determination it is—in a second step—determined by making use of the branch prediction device 1*a*, 1*b*, 1*c*, 1*d*, etc. assigned to the respectively determined branch class whether the jump or branch of the next (conditional) jump or branch instruction to be executed is likely to be taken or not (cf. also process step B illustrated in FIG. 4).

If, in the above-mentioned step A, it is determined that the next (conditional) jump or branch instruction to be executed is to be assigned to branch class 1, the first branch prediction device 1*a* illustrated in FIG. 3 is used.

If, however, in the above-mentioned step A, it is determined that the next (conditional) jump or branch instruction to be executed is to be assigned to branch class 2, the second branch prediction device 1*b* illustrated in FIG. 3 is used to determine whether the next (conditional) jump or branch instruction to be executed is likely to be taken or not.

Correspondingly—if, in the above-mentioned step A, it is determined that the next (conditional) jump or branch instruction to be executed is to be assigned to branch class 3—the third branch prediction device 1*c* illustrated in FIG. 3 is used to determine whether the next (conditional) jump or branch instruction to be executed is likely to be taken or not, etc.

As results from FIG. 3, each of the branch prediction devices 1*a*, 1*b*, 1*c*, 1*d*, etc. is of symmetrical structure and is adapted to assume four different states: state I (predict: "not taken, strong"), state II (predict: "not taken, weak"), state III (predict: "taken, weak"), und state IV (predict: "taken, strong").

Alternatively, the use of branch prediction devices 1*a*, 1*b*, 1*c*, 1*d* with asymmetrical structure is also conceivable, and/or of branch prediction devices 1*a*, 1*b*, 1*c*, 1*d* with more or less (e.g. two, three, or five) states.

The controller 13 examines the current state of the branch prediction devices 1*a*, 1*b*, 1*c*, 1*d* assigned to the determined branch class of the (conditional) jump or branch instruction to be executed (i.e. for a branch instruction assigned to branch class 1 the state of the first branch prediction device 1*a*, for a branch instruction assigned to branch class 2 the state of the second branch prediction device 1*b*, etc.).

If the respective branch prediction device 1*a*, 1*b*, 1*c*, 1*d* is in the above-mentioned state I (predict: "not taken, strong"), or in the above-mentioned state II (predict: "not taken, weak"), there will be determined as a prediction for the branch instruction to be executed: jump or branch is likely not to be taken (prediction: "not taken").

If, however, the respective branch prediction device 1*a*, 1*b*, 1*c*, 1*d* is in the above-mentioned state III (predict: "taken, weak"), or IV (predict: "taken, strong"), there will be determined as a prediction for the branch instruction to be executed: jump or branch is likely to be taken (prediction: "taken").

If it is predicted that a jump or branch is likely to be taken (prediction: "taken"), it may, for instance, be induced that the "Instruction Fetch" step 3*a* breaks through the above-mentioned sequential order—that is provided for the normal operation of the CPU core 11—during the loading of the machine instructions from the central memory, or that the pipeline mechanism is stopped, respectively, and/or appropriate further, conventional measures that are known from prior art may be initiated in the case of a prediction "taken".

If—which can be determined later only, or only if the branch or jump instruction to be executed runs through the pipeline 2 (in particular during the evaluation of the jump condition performed e.g. by the "Execute" step 3*e*)—it is determined (e.g. y the controller 13 or the "Execute" step 3*e*) that i) the jump or branch of the branch or jump instruction to be executed has actually been taken, or that ii) the jump or branch of the branch or jump instruction to be executed has not been taken, the state of the corresponding branch prediction device 1*a*, 1*b*, 1*c*, 1*d* (i.e. for a branch instruction assigned to branch class 1 the state of the first branch prediction device 1*a*, for a branch instruction assigned to branch class 2 the state of the second branch prediction device 1*b*, etc.) is—e.g. by the controller 13—updated accordingly, as will be described in more detail in the following (cf. also process step C illustrated in FIG. 4):

In the above-mentioned case i), i.e. if the jump or branch of the branch or jump instruction to be executed has actually been taken—as is illustrated in FIG. 3—a change of state illustrated by the arrows marked with the symbol "T" for "taken" is performed with the branch prediction device 1a, 1b, 1c, 1d assigned to the determined branch class of the (conditional) jump or branch instruction to be executed, not, however, with the remaining branch prediction devices 1a, 1b, 1c, 1d that are not assigned to the determined branch class of the (conditional) jump or branch instruction to be executed (i.e. with a previous state I (predict: "not taken, strong") a change of state to a new state II (predict: "not taken, weak"), with a previous state II (predict: "not taken, weak") a change of state to a new state III (predict: "taken, weak"), and with a previous state III (predict: "taken, weak") a change of state to a new state IV (predict: "taken, strong") (with a previous state IV (predict: "taken, strong") the corresponding branch prediction device 1a, 1b, 1c, 1d remains in the same state IV—cf. the arrows marked with the symbol "T" positioned at the very right in FIG. 3)).

Contrary to that, in the above-mentioned case ii), i.e. if the jump or branch of the branch or jump instruction to be executed has not been taken—as is also illustrated in FIG. 3—a change of state illustrated by the arrows marked with the symbol "N" for "not taken" is performed with the branch prediction device 1a, 1b, 1c, 1d assigned to the determined branch class of the (conditional) jump or branch instruction to be executed, not, however, with the remaining branch prediction devices 1a, 1b, 1c, 1d that are not assigned to the determined branch class of the (conditional) jump or branch instruction to be executed (i.e. with a previous state IV (predict: "taken, strong") a change of state to a new state III (predict: "taken, weak"), with a previous state III (predict: "taken, weak") a change of state to a new state II (predict: "not taken, weak"), and with a previous state II (predict: "not taken, weak") a change of state to a new state I (predict: "not taken, strong") (with a previous state I (predict: "not taken, strong") the corresponding branch prediction device 1a, 1b, 1c, 1d remains in the same state I—cf. the arrows marked with the symbol "N" positioned at the very left in FIG. 3)).

With the instant branch prediction method that has i.a. been explained by means of FIG. 4, a relatively good probability of hitting of the predictions can be achieved with relatively little effort, in particular relatively little hardware effort.

| List of Reference Signs | |
| --- | --- |
| 1a | branch prediction device |
| 1b | branch prediction device |
| 1c | branch prediction device |
| 1d | branch prediction device |
| 2 | pipeline |
| 3a | Instruction Fetch step |
| 3b | Instruction Decoding step |
| 3c | Address Generation step |
| 3d | Operand Fetch step |
| 3e | Execute step |
| 3f | Store Result step |
| 3g | Update Program Counter step |
| 10 | microprocessor system |
| 11 | CPU |
| 12 | memory controller |
| 13 | controller |
| 15 | microchip |
| 16 | system bus |
| 17 | memory |
| 18 | memory |

What is claimed is:

1. A branch prediction method for use in a microprocessor device, comprising:
   determining which of a plurality of predetermined branch classes a respective branch instruction to be executed is assigned to, wherein the plurality of predetermined branch classes comprise a branch class for 32 bit forward-direction branch instructions, a branch class for 16 bit forward-direction branch instructions, and a branch class for backward-direction branch instructions;
   determining whether a branch is likely to be taken or not, depending on a determined branch class;
   updating a state of a branch prediction device assigned to the determined branch class, depending on whether the branch of the respective branch instruction to be executed has been taken or not, wherein the branch prediction device is adapted to assume at least four states.

2. The branch prediction method according to claim 1, wherein, for determining of whether the branch is likely to be taken or not, a respective branch prediction device assigned to the branch class determined is used.

3. The branch prediction method according to claim 2, wherein the respective branch prediction device assigned to the determined branch class is an adaptive branch prediction device.

4. The branch prediction method according to claim 1, wherein, during an examination of an instruction length of the respective branch instruction to be executed, it is determined whether the respective branch instruction to be executed is a long or a short branch instruction.

5. The branch prediction method according to claim 4, wherein it is determined that the respective branch instruction to be executed is a long branch instruction if the instruction length of the respective branch instruction to be executed is 32 bits.

6. The branch prediction method according to claim 4, wherein it is determined that the respective branch instruction to be executed is a short branch instruction if the instruction length of the respective branch instruction to be executed is 16 bits.

7. The branch prediction method according to claim 1, wherein a jump direction of the respective branch instruction to be executed is examined during the determination of which one of the plurality of predetermined branch classes is assigned to the respective branch instruction to be executed.

8. The branch prediction method according to claim 7, wherein, during the examination of the jump direction of the respective branch instruction to be executed, it is determined whether the respective branch instruction to be executed is a forward or a backward branch.

9. The branch prediction method according to claim 1, wherein an instruction type of the respective branch instruction to be executed is examined during the determination of which one of the plurality of predetermined branch classes is assigned to the respective branch instruction to be executed.

10. The branch prediction method according to claim 1, wherein a function of the respective branch instruction to be executed is examined during the determination of which one of the plurality of predetermined branch classes is assigned to the respective branch instruction to be executed.

11. A branch prediction method for use in a microprocessor device, comprising:
   determining which of a plurality of predetermined branch classes a respective branch instruction to be executed is assigned to, wherein the plurality of predetermined branch classes comprise a branch class for 32 bit forward-direction branch instructions, a branch class for 16 bit forward-direction branch instructions, and a branch class for backward-direction branch instructions;

determining whether a branch is likely to be taken or not, depending on a determined branch class;

updating a state of a branch prediction device assigned to the determined branch class, depending on whether the branch of the respective branch instruction to be executed has been taken or not, wherein the branch prediction device is adapted to assume at least four states; and wherein a thread identifier of the respective branch instruction to be executed is examined during the determination of which one of the plurality of predetermined branch classes is assigned to the respective branch instruction to be executed.

12. The branch prediction method of claim 1, wherein the at least four states of the branch prediction device comprise: a predict not taken strong state; a predict not taken weak state; a predict taken weak state; and a predict taken strong state.

13. A microprocessor device comprising:

a plurality of branch prediction devices that are assigned to a respective one of a plurality of predetermined branch classes, wherein the plurality of predetermined branch classes comprise a branch class for 32 bit forward-direction branch instructions, a branch class for 16 bit forward-direction branch instructions, and a branch class for backward-direction branch instructions;

a device for determining which of the plurality of predetermined branch classes a respective branch instruction to be executed is assigned to, wherein the device for determining which of the plurality of predetermined branch classes the respective branch instruction to be executed is assigned to is designed and equipped such that it examines an instruction length of the respective branch instruction to be executed; and a device for updating a state of the plurality of branch prediction devices, depending on whether a branch of the respective branch instruction to be executed has been taken or not, wherein the plurality of branch prediction devices are adapted to assume at least four states.

14. The microprocessor device according to claim 13, comprising at least two branch prediction devices that are assigned to a respective one of the plurality of predetermined branch classes.

15. The microprocessor device according to claims 13, wherein the plurality of branch prediction devices are adaptive branch prediction devices.

16. The microprocessor device according to claim 13, wherein the device for determining which of the plurality of predetermined branch classes the respective branch instruction to be executed is assigned to is designed and equipped such that it examines a jump direction of the respective branch instruction to be executed.

17. The microprocessor device according to claim 13, wherein the device for determining which of the plurality of predetermined branch classes the respective branch instruction to be executed is assigned to is designed and equipped such that it examines an instruction type of the respective branch instruction to be executed.

18. A branch prediction method for use in a microprocessor device, comprising:

determining which of a plurality of predetermined branch classes a respective branch instruction to be executed is assigned to, wherein the plurality of predetermined branch classes comprise a branch class for 32 bit forward-direction branch instructions, a branch class for 16 bit forward-direction branch instructions, and a branch class for backward-direction branch instructions;

determining whether a branch is likely to be taken or not, depending on a determined branch class;

updating a state of a branch prediction device assigned to the determined branch class, depending on whether the branch of the respective branch instruction to be executed has been taken or not, wherein the branch prediction device is adapted to assume at least four states.

19. A branch prediction method for use in a microprocessor device, comprising:

determining which of a plurality of predetermined branch classes a respective branch instruction to be executed is assigned to, wherein the plurality of predetermined branch classes comprise a branch class for forward-direction branches and a branch class for backward-direction branches, the determining comprising detecting whether the respective branch instruction to be executed belongs to the branch class for forward-direction branches or to the branch class for backward-direction branches by examining a statical attribute of the respective branch instruction to be executed indicating which of a backward or a forward jump-direction is assigned to the respective branch instruction to be executed;

determining whether a branch is likely to be taken or not, depending on a determined branch class; and updating a state of a branch prediction device assigned to the determined branch class, depending on whether the branch of the respective branch instruction to be executed has been taken or not.

* * * * *